United States Patent [19]

Lund

[11] Patent Number: 5,283,862
[45] Date of Patent: Feb. 1, 1994

[54] NOTEBOOK COMPUTER WITH REVERSIBLE COVER FOR EXTERNAL USE OF MEMBRANE SWITCH SCREEN

[76] Inventor: Alan K. Lund, 4165 Lafayette Pl., Lee's Summit, Mo. 64063

[21] Appl. No.: 48,900

[22] Filed: Apr. 16, 1993

Related U.S. Application Data

[63] Continuation of Ser. No. 612,956, Nov. 12, 1990, abandoned, which is a continuation-in-part of Ser. No. 420,047, Oct. 11, 1989, abandoned.

[51] Int. Cl.$^5$ .............................................. G06F 13/00
[52] U.S. Cl. ......................... 395/155; 364/DIG. 2; 364/234; 364/231.1; 364/231; 364/231.2; 364/237.2; 364/927; 364/927.2; 364/927.64; 364/928
[58] Field of Search ................ 364/DIG. 1 MS File, 364/DIG. 2 MS File, ; 395/100, 115, 118, 144, 145, 156, 155, 325, 500, 800; 340/710, 711, 712, 713, 714, 715

[56] References Cited

U.S. PATENT DOCUMENTS

| | | | |
|---|---|---|---|
| 4,571,456 | 2/1986 | Paulsen et al. | 179/2 C |
| 4,730,364 | 3/1988 | Tat-Kee | 16/337 |
| 4,928,094 | 5/1920 | Smith | 340/712 |
| 4,990,901 | 2/1991 | Beiswenger | 340/712 |

Primary Examiner—Robert B. Harrell
Attorney, Agent, or Firm—Litman, McMahon & Brown

[57] ABSTRACT

A notebook computer unit formed by a base housing and a hinged cover panel has a conventional keyboard mounted on the base housing, a flat panel display device mounted on the cover panel, and a transparent membrane switch array overlayed on the display. The unit includes a separable and reversible hinge mechanism and a separable and reversible electrical connector assembly which allow the cover panel to be detached, reversed, and re-attached to place the unit in one of two configurations. In one configuration, the display and tactile membrane switch array face outwardly with the cover panel overlying the base for operation of the unit by viewing the display and touching the membrane switch array to enter data and select options displayed. Alternatively, the cover panel may be oriented with the display generally facing the standard keyboard for use of the unit as a conventional notebook type computer.

20 Claims, 7 Drawing Sheets

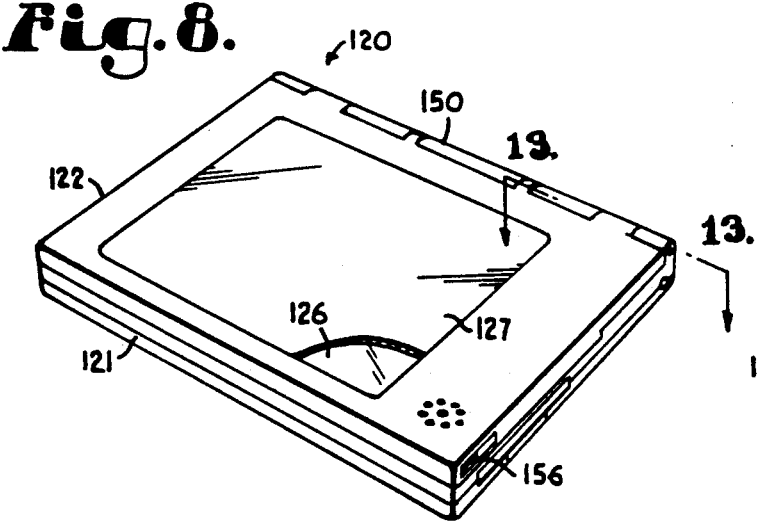
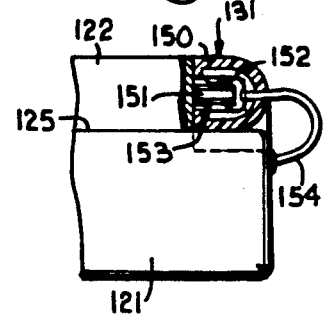
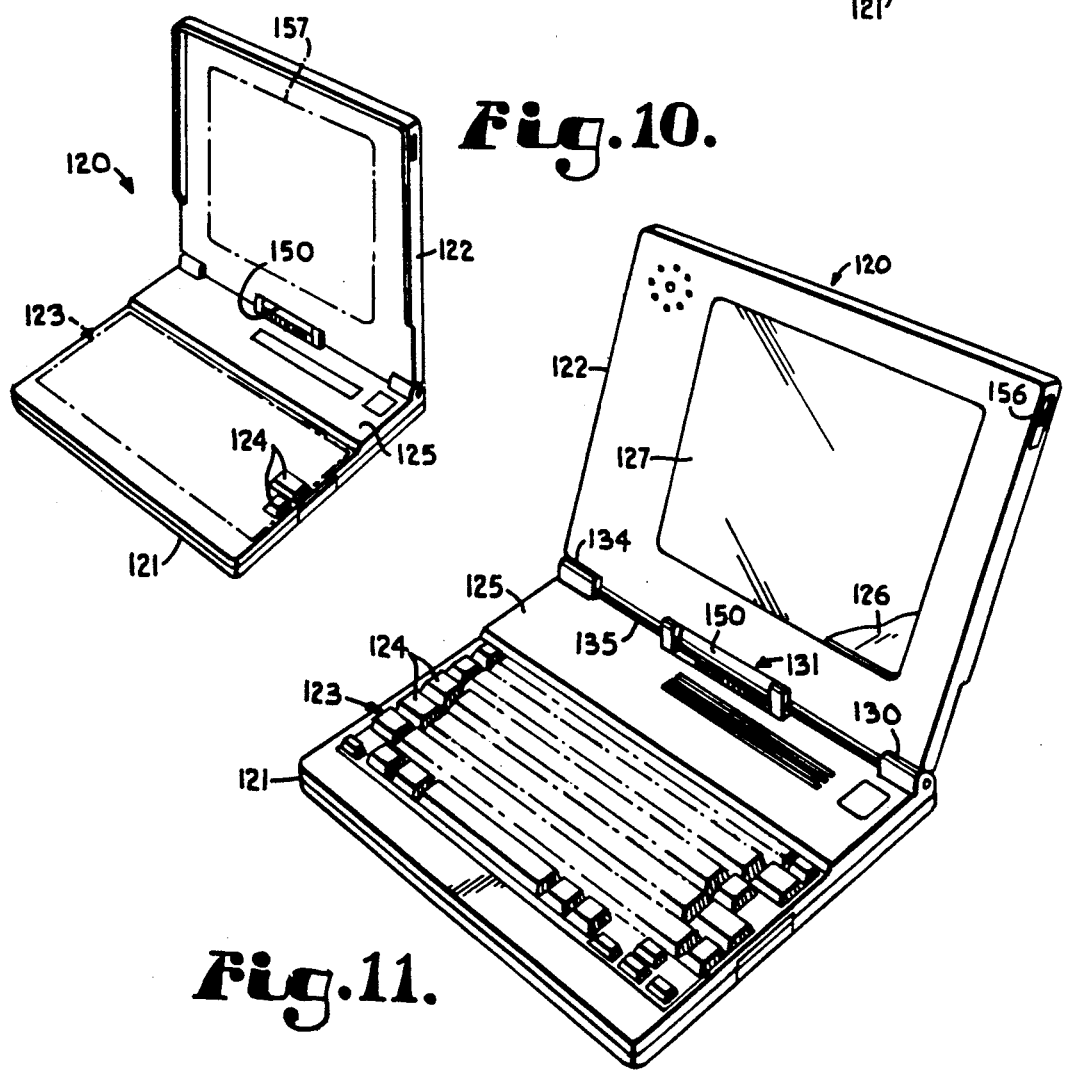

NOTEBOOK COMPUTER WITH REVERSIBLE COVER FOR EXTERNAL USE OF MEMBRANE SWITCH SCREEN

CROSS-REFERENCE TO RELATED APPLICATION

This application is a continuation of application, Ser. No. 07/612,956, filed Nov. 12, 1990, now abandoned, which was a continuation-in-part of application, Ser. No. 07/420,047, filed Oct. 11, 1989 for PORTABLE ELECTRONIC SUBJECT ORGANIZING SYSTEM which is now abandoned.

BACKGROUND OF THE INVENTION

1. Field of the Invention

The present invention relates to a notebook or laptop type computers and, more particularly, to such a computer having a membrane switch array overlayed on a flat panel display which may be positioned on an external surface of the computer for convenient access of the membrane switch array to operate the computer.

2. Description of the Related Art

Record keeping is essential to the operation of any business, and a significant percentage of a business's time and space overhead must usually be dedicated to the recording and continual updating of information related to the various aspects of the operation. Such record keeping is necessary not only for the business entity as a whole, but also for individual components of the company, such as divisions and departments, and also for some individual workers. Where a worker must deal directly with a large number of clients, customers, suppliers, or the like, it is often desirable to maintain a file of the names of contacts, addresses, phone numbers, appointment schedules, records of contacts, expense account details, personal interests and idiosyncrasies of the contacts, and the like.

The business supplies industries have provided a number of products for facilitating such client record keeping activities. Such records documentation products include index card files, appointment books, address books, special calendars, and the like. Some such products also include combinations of the functions of these products. One particularly useful product is the Rolodex file (Rolodex Corporation) in which cards containing names, addresses, telephone numbers, and miscellaneous notes are connected to a rotary spindle, usually in alphabetical order according to a company's or individual's name. While such a device is very convenient for quickly finding information such as names, addresses, and telephone numbers, it is not well suited for scheduling appointments, tracking contacts, and other time and date functions without time consuming manipulation of the individual file cards. Additionally, such a rotary file is not well suited for portability whereby a salesman in the field, for example, could quickly consult his appointment schedule or set up appointments on-the-spot.

There have been some efforts to improve upon these conventional paper based card file type tools by the use of computer technology. Such products are embodied as handheld calculator like devices, laptop type computers, and devices occupying a middle ground therebetween. The calculator type devices generally include very limited display capabilities, ranging between a few tens of characters to a few hundred characters, and very limited memory capacities. The calculator type devices, while convenient in size, are usually limited in capabilities and are probably best suited to specific applications such as telephone directories.

The laptop type computers are miniaturized general purpose personal computers. They usually have most of the capabilities of conventional desktop personal computers, including relatively large memory capacities, mass storage devices including small floppy disk drives and often hard disk drives, full capability display screens which are usually liquid crystal displays (LCD's), full capability keyboards, and input/output ports for connection to printers, modems and the like. Some include video ports for connection to cathode ray tube (CRT) monitors. One problem with laptops is size and weight, as a result of their complement of capabilities. This makes them cumbersome to carry in the field to occasionally recall a phone number, address, or note. Another problem is complexity of use. While so-called computer literacy is increasing rapidly, there are still considerable numbers of workers who are not acclimated to using computers and are reluctant to attempt to learn to use computers and software therefor.

There are midsized electronic card file devices which are larger than the pocket calculator type, but smaller than laptop computers. In general, the midsized devices have larger screens, usually LCD's, and full "qwerty" (typewriter type) keyboards. Generally, they do not have removable mass storage devices, such as floppy disk drives, or I/O ports, and memory capacities are much less than that of laptops. Many such midsized devices have proprietary operating systems and use proprietary software, rather than the generic equivalents usable on laptops.

Personal information management (PIM) software has been developed to increase work productivity by allowing information regarding clients, customers, and the like to be entered and quickly recalled. Most such PIM software has general application and allows the user to define the types of information to be entered, such as by the user defining data fields to be entered for each record. Some PIM software provides formats with preset data fields. One problem with existing PIM programs is that their flexibility and power increases their complexity and the time and effort required to learn to set them up and use them. Many such programs do not provide for manipulation of data in a manner which comes naturally, particularly to a nonexperienced computer user. Finally, most conventional PIM software is adapted for use on desktop, portable, and laptop personal computers and is, thus, not highly portable in the field.

The size and weight of laptop type computers have been decreasing as further developments have occurred in circuit integration and in increased density and reduced sized mass storage devices. However, the principal data entry and manipulation interface between the user and such computers is a conventional keyboard. Those who cannot type proficiently often find difficulty in deriving meaningful benefits of the capabilities of such computers. Even if the manipulation of data on such a computer is facilitated by software and a transparent membrane switch array overlayed on an LCD screen, such as is disclosed in the aforementioned application, Ser. No. 07/420,047, conventional notebook computers are not structured and balanced for convenient use of such improvements. Specifically, conventional "clamshell" type notebook computers, wherein the LCD screen is positioned on the inside surface of a cover panel of the unit, are not well suited to using a membrane switch array over the LCD screen because of the need to hold the cover member with one hand to avoid pivoting the display backward or tipping the unit as a whole backward when making tactile selections on the screen.

SUMMARY OF THE INVENTION

The present invention provides a portable client tracking system which is particularly well adapted for use by persons who are not experienced computer users for creation of files to track activities with clients, customers, suppliers, and the like. An apparatus for the system includes a small, highly portable case housing a substantially complete personal computer with adaptations for optimum use in the present invention. The invention includes a client tracking program which is similar in some respects to conventional personal information management type programs and provides features particularly adapted for conveniently managing a database of customers, clients or the like and for use with the computer unit of the present invention.

The client tracking program is a menu driven flat file type of data base with preset fields for information relating to the identity of personal contacts. In addition, a note field or window allows the entry of any of a plurality of standard notes or free form notes. The note window also includes an indication of the existence and number of voice notes relating to a particular data record. Client records can be searched using entries in data fields, standard notes, or dates as search criteria. Searching can also be done on the basis of multiple criteria related by Boolean logic operators such as AND, AND/OR, and the like. Client records can also be searched on the basis of a range of dates occurring in date related entries in the records.

The client tracking program is provided with multiple levels of nested menus for data record activities, such as the creation of data records, the editing of records, update of records, and the like. The program cooperates with the LCD display/membrane switch array on the computer unit in such a manner as to greatly facilitate the use of the system by users with little computer background. Data records are created by entering answers to prompts to thereby fill in the preset data fields. Once the data records have been created, a desired record can be easily recalled or otherwise manipulated by merely touching one of a plurality of displayed menu selections. If desired, and a printer is connected to the computer unit, a record may be printed out in a concise manner for quick reference.

The computer unit includes a base housing having therein a central processing unit and support circuitry, as well as a mass storage device such as a small form factor hard disk drive and a conventional keyswitch type keyboard. A cover panel is hingedly connected to the base housing and has an LCD screen with a transparent membrane switch array overlayed on the screen. The computer and the client tracking program, or other software, can be utilized by using either the standard keyboard or by touching regions of the membrane array through which indicia indicating possible selections are displayed. A "soft" keyboard, which may be a replica of the conventional keyboard on the unit, may also be displayed on the screen.

In particular, the present invention provides hinge members and electrical connectors which enable the cover panel to be layed flat over the base housing for operation entirely by use of the display/membrane array or, alternatively, for the cover panel to be positioned to allow operation of the unit using the conventional keyboard while viewing the display on the cover panel.

In a preferred embodiment of the present invention, separable hinges connect the cover panel to the base housing, and a separable electrical connector assembly provides signal communication between the display and membrane array and the main circuit board within the base housing. The hinges and electrical connector cooperate to allow the cover panel to be separated from the base housing, reversed, and re-attached to allow the cover panel to be closed over the base unit with the display and membrane array facing upward, away from the base housing. The hinges include spring detent members which are aligned along the hinge axis between the base housing and the cover panel. The electrical connector assembly includes a card edge socket pivotally mounted on the hinge axis and connected to the main circuit board by a multiconductor ribbon cable and a matching card edge panel connector extending from the cover panel and received in the socket. The socket has a plurality of pairs of contacts on opposite sides thereof with the sequence of contacts on one side being reversed on the opposite side. Similarly, the panel connector has opposite, reversed pairs of conductive traces which cooperate with the socket contacts to allow the connector to be reversibly received in the socket with full functionality of the unit.

In a modified embodiment of the present invention, the cover panel is hingedly connected to the base housing by a pair of compound hinges, each having two pivots, which allows the cover panel and base housing to be mutually pivoted to overlay the cover panel over a lower side of the base housing with the display and membrane array facing outward from the base housing or, alternatively, for the cover panel to be pivoted into a position in which the display generally faces the keyboard for use of the unit in the manner of a conventional notebook type computer.

The computer unit according to the present invention retains the standard features of a conventional laptop type computer while providing additional capabilities for a temporary dedicated use of the unit.

The principal objects of the present invention are: to provide an improved method and apparatus for tracking client related information; to provide such a method comprising maintaining a database of client data records including preset data fields, standard notes, freeform notes, time and date related notes and voice notes; to provide such a method which provides the capability of recalling records by specifying the name or company of a client, a standard note in the record, or a date related item in a record, either by single search criteria or by combinations of criteria; to provide such a method including the capability of printing out a concise copy of a record; to provide such a method in which the manipulation of records is accomplished principally by the selection of menu items from a system of nested menus; to provide such a method wherein the menu selection items are displayed as menu selection boxes which can be selected by touching the desired selection box; to provide such a method which is simple to learn and intuitive in operation for use by persons with minimal previous computer experience; to provide an apparatus for practicing such a method including a portable computer unit which is operated by a widely used operating system and which is hardware compatible with widely used types of peripherals for economical manufacturing and convenient implementation; to provide such an apparatus including a flat panel display device, such as a liquid crystal display, having a transparent membrane switch array overlayed thereon; to provide such an apparatus which may include a "soft" keyboard which is displayed on the screen and which is actuated by touching displayed keys to thereby input alphanumeric data; to provide such an apparatus including a mass storage device, such as a small form factor hard disk drive; to provide such an apparatus including a voice digitizer and playback subsystem for the storage and playback of voice notes related to client records; to provide such an apparatus including peripheral ports for the connection of devices such as a printer, a mouse, a conventional keyboard, and the like; to provide such an apparatus which is highly portable and which includes flexible types of portable power supplies including a rechargeable battery pack, an AC power supply, or an adapter for powering the apparatus from an automotive battery system; to provide such an apparatus in the form of a modified notebook type computer; to provide such a computer including a base housing having a main computer board, a conventional keyswitch keyboard, and a hard disk drive mounted therein and a cover panel having a flat panel display with a transparent membrane switch array overlayed thereon; to provide such a computer in which the cover panel is hingedly connected to the base housing and the display/membrane array is connected to the computer main board in such a manner that the cover panel may be folded into covering relation to the base housing with the display/membrane array facing outward or, alternatively, the cover panel may be positioned relative to the base housing whereby the computer may be used in the manner of a conventional notebook computer; to provide a preferred embodiment of such a computer wherein aligned spring detent members form a separable hinge and a separable electrical connector allow the cover panel to be separated from the base housing, reversed, and re-attached to position the cover panel in covering relation to the base housing with the display/membrane array facing outward; to provide an alternative embodiment of such a computer wherein the cover panel is connected to the base housing by compound hinges which allow the cover panel to be pivoted from a closed position of a conventional notebook computer to a position in which the cover panel overlies a lower surface of the base housing with the display/membrane array facing outward; and to provide such an apparatus which is economical to manufacture, convenient and reliable to use, and which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 8 is a perspective view of a notebook computer unit with an external membrane switch/screen which embodies the present invention and which is illustrated with the membrane switch array and screen positioned externally of the unit, a portion of the array being broken away to illustrate the flat panel display therebelow.

FIG. 9 is an enlarged fragmentary side elevational view of the computer unit with portions broken away to illustrate details of a hinged edge card connector arrangement and a flexible ribbon cable connected thereto.

FIG. 10 is a perspective view of the computer unit at a reduced scale and illustrates an open position the cover panel having the membrane switch array and flat panel display on an outside surface therof, an alternative second flat panel display on an inside surface of the cover panel being shown in phantom lines.

FIG. 11 is a perspective view similar to FIG. 8 with the cover panel opened for access to a conventional keyboard and reversed so that the membrane switch array and display face a user of the keyboard.

DETAILED DESCRIPTION OF THE INVENTION

Figure 1:
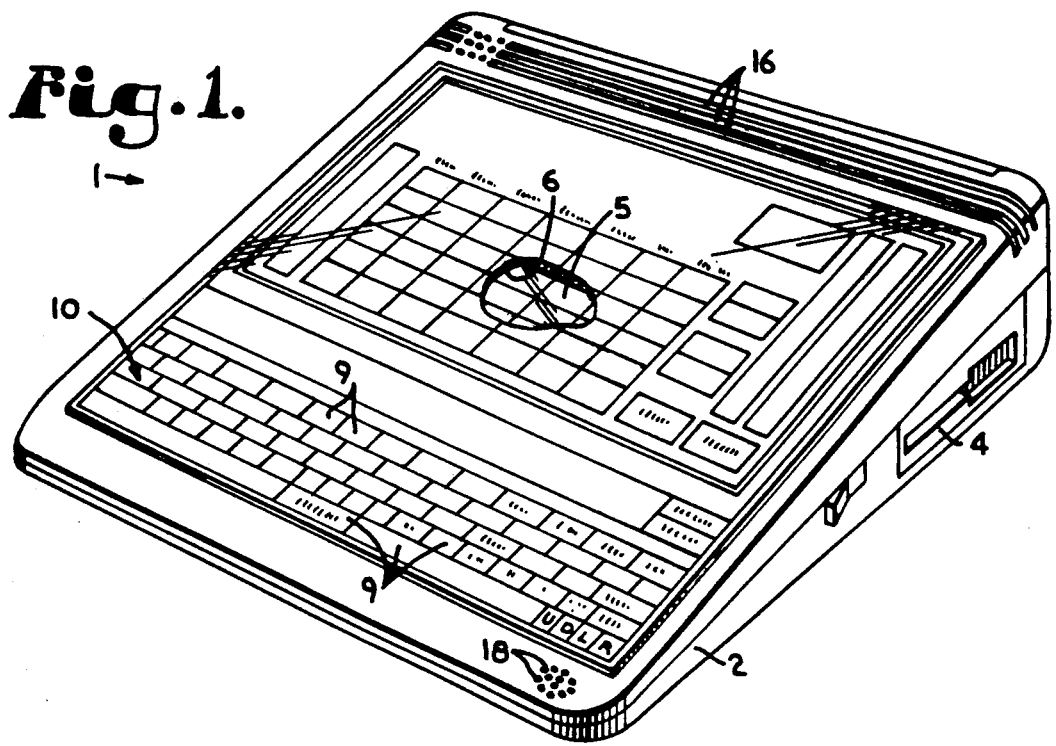
FIG. 1 is a perspective view of a one-piece client tracking computer unit with a portion of a transparent membrane switch array broken away to illustrate an LCD screen thereunder.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numberal 1 generally designates a client tracking computer unit. The computer unit 1 generally includes a portable computer case 2 housing a central processing unit or CPU 3 (FIG. 3), a disk drive 4, a high resolution liquid crystal display (LCD) device 5, and a transparent membrane switch array or transparent membrane switch array or membrane array 6 overlayed on the LCD 5. The CPU 3 executes a client tracking program 7 stored by the disk drive 4 to create and maintain a database of client data records 8. Data for the records 8 is entered by touching the membrane array 6 in the area of keys 9 of a keyboard 10 displayed by the LCD 5. Client record activities related to manipulation of the client records 8 are effected by touching the membrane array 6 in the area of menu selections 11 displayed on the LCD 5. The computer unit 1 is provided with a voice digitizer 12 and a speaker 13 to enable voice notes to be stored by the disk drive 4 and subsequently played back through the speaker 13. Each voice note is linked or associated by the program 7 with a particular client record 8.

Figure 2:
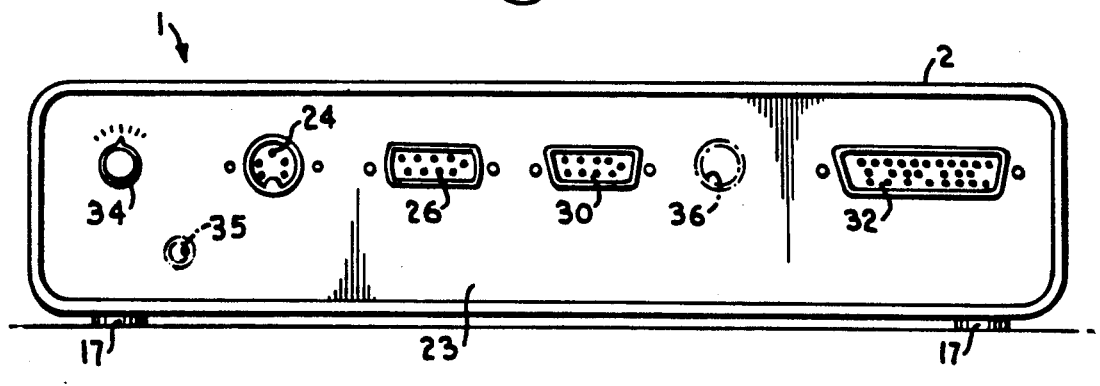
FIG. 2 is a somewhat enlarged, rear elevational view of the one-piece client tracking computer unit and illustrates peripheral connectors of the unit.
Figure 3:
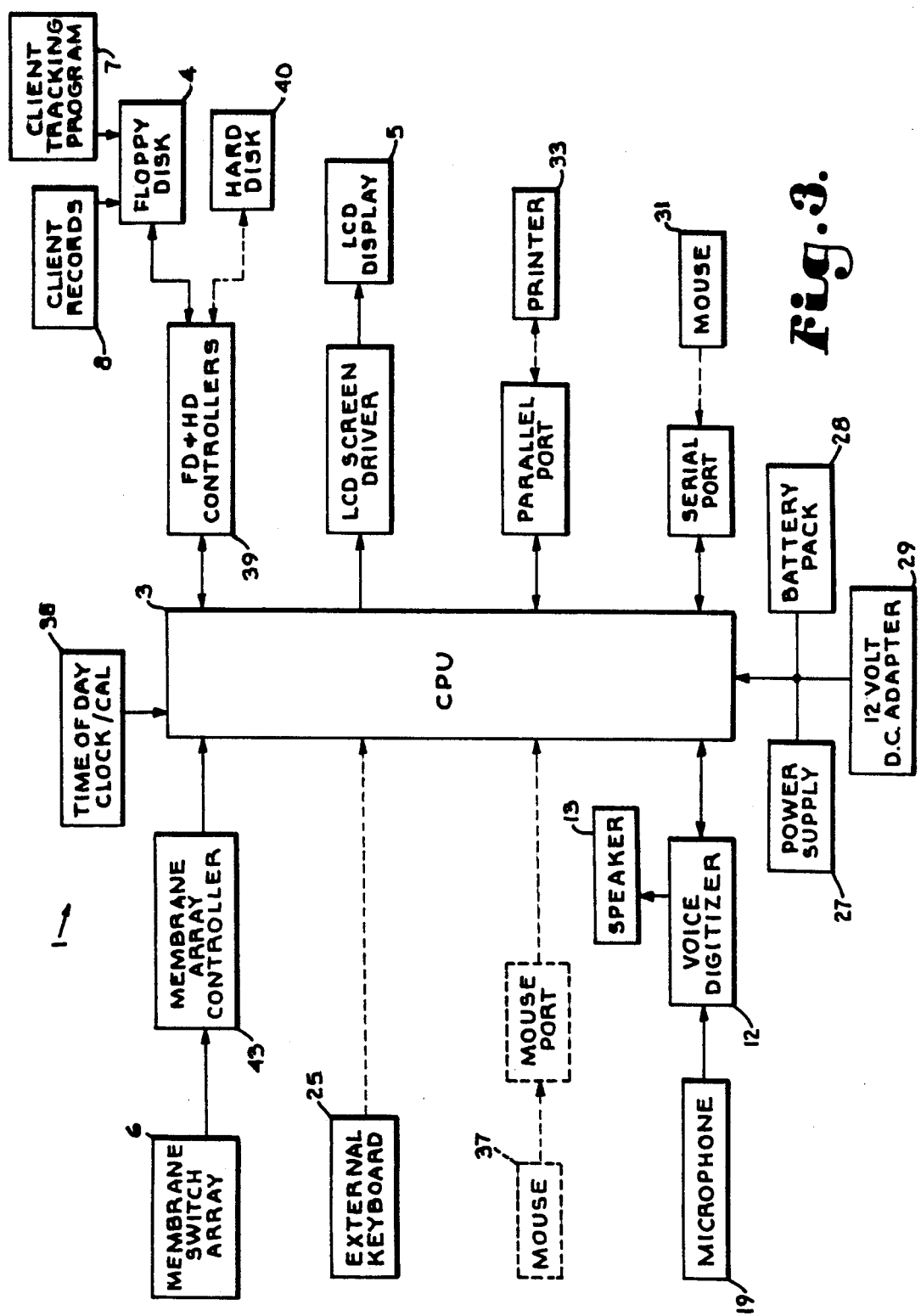
FIG. 3 is a block diagram of the principal components of the client tracking computer unit.

Referring to FIGS. 1, 2 and 3, the illustrated case 2 is substantially wedge shaped and is about the size and shape of a thick loose leaf notebook binder. The LCD 5 and membrane array 6 are positioned on a top surface of the case 2. The upper surface of the case 2 is provided with convective cooling slots 16 which cooperate with similar openings (not shown) on a lower surface of the case 2 to allow air to flow through the unit 1 to cool the components therein. The case 2 is provided with feet 17 to raise the unti 1 above a surface on which it is placed to facilitate airflow under the unit 1. Microphone openings 18 are provided bove a microphone 19 which is connected to the voice digitizer circuitry 12 to admit sound to the microphone 19. The illustrated case 2 has speaker openings 20 on the upper surface above the speaker 13 to channel sound therefrom. Alternatively, the speaker 13 may be mounted on a lower wall of the case 2.

The case 2 includes a back panel 23 on which are mounted connectors for the connection of external peripheral devices to the computer unit 1. The illustrated unit 1 includes a keyboard connector 24 for the connection of an external keyboard 25; a power connector 26 for the connection of an AC power supply 27; a rechargeable battery pack 28, or a twelve volt DC adapter 29 for powering the unit 1 by an automotive; an RS-232 serial port connector 30 for the connection of serial interface devices such as a serial mouse 31, a modem (not shown), or a serial printer (not shown); and a Centronics type parallel printer connector 32 for the connection of a parallel printer 33. The back panel 23 is provided with a contrast control 34 for adjusting the contrast of the LCD 5. Additionally, a connector for an external microphone (not shown) and DIN type connector 36 for connection of a bus type mouse 37 to the unit 1 are provided on the back panel 23.

Referring particularly to FIG. 3, the CPU 3 includes a microprocessor and support circuitry including RAM, ROM, timing circuitry, bus circuitry, and the like which are typically required to implement a computer and which are conventially included on a computer motherboard. The illustrated CPU 3 is an IBM-PC/XT (International Business Machines Corporation) compatible computer which uses a version of MS-DOS (Microsoft Disk Operating System, Microsoft Corporation) as an operating system. A motherboard which is particularly well suited for the unit 1 is the Little Board/PC, Model 4B, manufactured by Ampro Computers, Inc. The Model 4B uses an NEC V40 microprocessor (NEC Corporation) operating at 7.16 megahertz and which is compatible with the Intel 8088 procesor (Intel Corporation). The Model 4B board has nominal dimensions of 8 inches by 5.75 inches by 1 inch and, thus, fits well within the case 2. The CPU 3 is provided with 512 kilobytes of RAM. Alternatively, other commercially available motherboards, preferably employing 8088 compatible microprocessors, may be employed for the CPU 3. Also, the circuitry comprising the CPU 3 and other circuitry, as will be detailed below, may be provided on a single computer board with the CPU 3.

The unit 1 is provided with a battery backed time-of-day clock/calendar 38 which maintains the time of day and the date for use by the CPU 3 and the software executed thereby. The floppy disk drive 4 is interfaced to the CPU 3 and controlled by a floppy disk controller 39. The unit 1 may be provided with a hard disk drive 40 in addition to the floppy drive 4. If so, the controller 39 is a combination floppy disk and hard disk controller. The floppy drive 4 is preferably a 3.5 inch, 1.44 megabyte capacity drive which uses standard double sided, high density 3.5 inch floppy disks (not shown separately). This capacity disk provides ample storage capacity for the operating system, the client tracking program 7, and a moderately sized database of client record 8. Operating speed of the unti 1 is enhanced, as is storage capacity, by the provision of a hard disk 40. The hard disk 40 may be any of a number of available 3.5 inch hard drives or, preferably, a smaller form factor drive, such as a Prairie Technology Model 220 2.5 inch, 20 megabyte hard disk drive. A storage capacity of 20 megabytes should be adequate for the unit 1.

The LCD display 5 is preferably a high resolution display, and the illustrated display 5 is a Hitachi model LMG6010XUFR reflective display having a 640 by 480 pixel resolution. Alternatively, the screen 5 may be backlit, as by incorporating an electro-luminescent panel therebehind. The display 5 is interfaced to the CPU 3 by a controller or driver 42, such as a Yamaha Display Master model YDM-6420. The membrane switch array 6 is interfaced to the CPU 3 by a membrane switch array controller 43. Although a liquid crystal display is preferred because of its lower power consumption, other types of flat panel technologies may be employed, such as gas plasma displays and the like. Additionally, the unit 1 may be provided with a graphics controller and connector (not shown) for connecting a CRT video monitor (not shown) to the unit 1.

The membrane array 6 and controller 43 may be any suitable combination which is compatible in size and shape to the particular LCD 5 and which is compatible with the CPU 3. A suitable combination is an Elographics Duratouch model membrane array with an Elographics model E271-140 membrane switch array controller. The membrane array 6 is essentially a high resolution two dimensional array of touch switches and is also sold under the trademark Touchscreen (Dorman-Bogdonoff Corp.). The controller 43 cooperates with the membrane array 6 to locate the coordinates of an area tactilely engaged or touched, the coordinates being communicated to a software driver executed by the CPU 3. When the soft keyboard 10 is active, touching one of the displayed keys 9 causes an ASCII code to be generated which corresponds with the character displayed on the key 9. The membrane array 6 is overlayed on th LCD 5, and a calibration is undertaken to assure that the coordinates of an area touched on the membrane array 6 correspond to the coordinates of an underlying area of the LCD 5.

The unit 1 may be provided with a bus mouse port or interface 45 for interfacing the bus mouse 37 to the CPU 3 via the connector 36. Alternatively, the serial mouse 31 may be interfaced to the CPU 3 through a serial port 46 via the serial connector 30. There are a number of suitable mice of each type which are available, and the selection of one would depend primarily on the user's preferences. The unit 1 does not really require a mouse 31 or 37 for convenient pointing and selection to operate the client tracking program 7. The ability to make a selection by touching a displayed menu item by the cooperation between the display 5 and membrane array 6 is even more direct and intuitive than the use of a mouse. However, some users may prever using a mouse, particularly if the unit 1 is provided with an external video monitor. The serial port 46, although shown separately in FIG. 3, may be incorporated within the CPU 3. Similarly, a parallel port 47, for connection of the printer 33 to the unit 1 via the parallel connector 32, may also be embedded within the CPU 3.

The voice digitizer 12 allows the entry of vocal notes for linking to a particular client record 8 and subsequent replay through the speaker 13. A suitable voice digitizer 12 is the Covox Voice Master Key System, model PCKS-PO-200. The speaker 13 is interfaced to the digitizer circuit 12 for playback of voice notes. The amount of storage capacity required for a voice note is proportional to the time length of the voice note. Thus, on a unit 1 employing only a floppy disk 4, the number and length of voice notes should be limited and deleted when not needed to avoid filling the disks. A unit 1 employing a hard disk 4 is less limited in the number and length of voice notes which can be recorded and kept.

Figure 4:
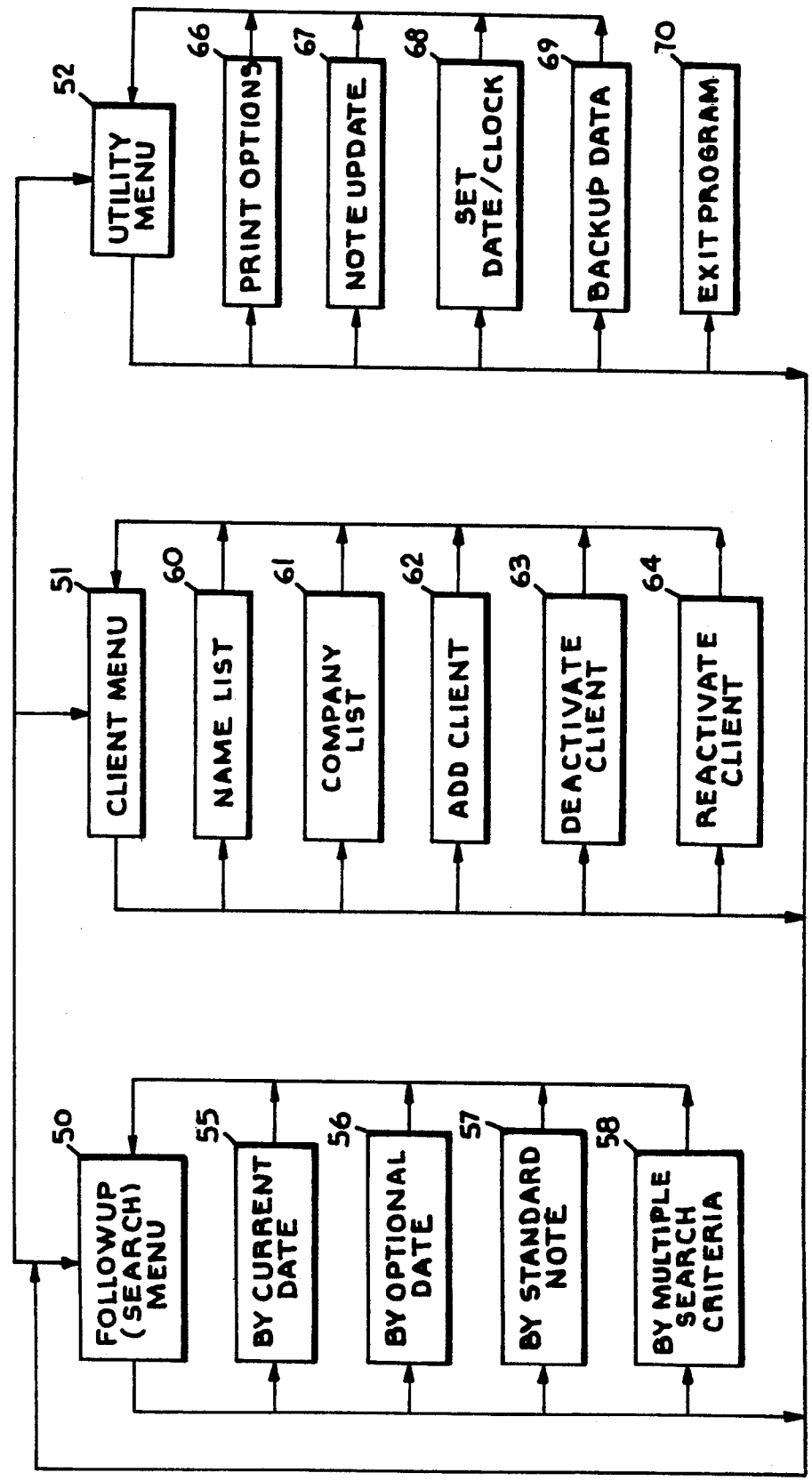
FIG. 4 is a menu flow diagram of a client tracking program forming a client tracking method of the present invention.

FIGS. 4-7 illustrate diagramatically the function of portions of the client tracking program 7, at least as it is presented to and affects the user. FIG. 4 illustrates the top menu selections of a followup or search menu 50, a client menu 51, and a utility menu 52. The selection of any of these main menus brings up sub-menu selections, illustrated below the main selections 50-52. Under the followup menu 50 are search criteria selections including current date 55, optional date 56, standard note 57, and multiple search criteria 58. Under the client menu 51 are selections for name list 60, company list 61, add client 62, deactivate client 63, and reactivate client 64. Under the utility menu 52 are print options 66, note update 67, set date/clock 68, backup data 69, and exit program 70.

Figure 7:
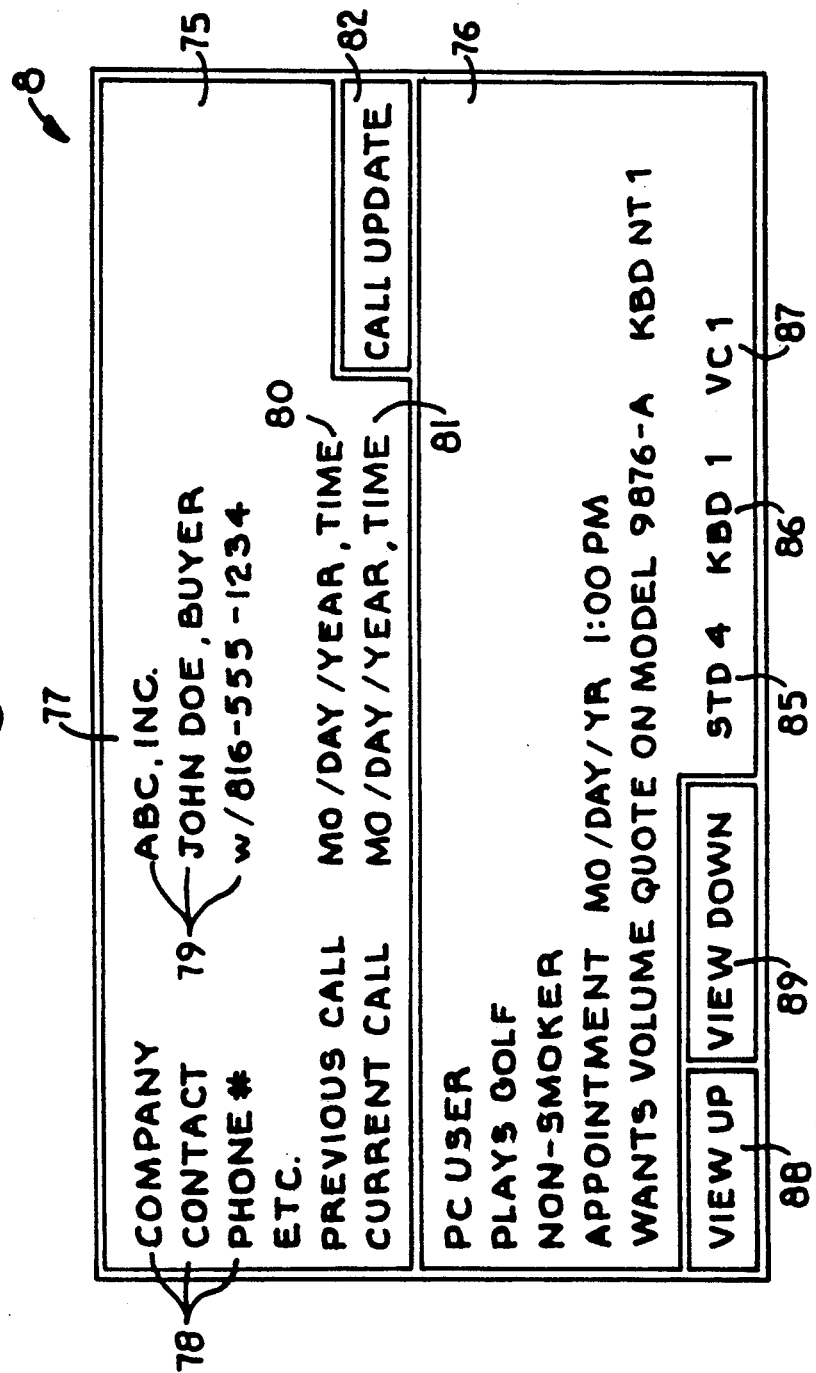
FIG. 7 is an exemplary client record created by the client tracking program and illustrates data entries in preset data fields and standard notes and a free form note in a note window.

FIG. 7 illustrates an exemplary client data record 8 including a fixed preset window 75 at the top and a scrollable note window 76 at the bottom. The preset window 75 is provided with preset data fields 77 corresponding to preset data field identifiers 78. The illustrated identifiers 78 include company, contact, phone number, and the like. The preset data fields 77 include data entries 79, such as ABC, Inc.; John Doe, Buyer; an area code and phone number; and the like. The preset window 75 includes a previous call field 80, a current call field 81, and a call update selection 82.

The note window 76 is provided for the entry of various notes regarding the client identified in a client record 8 and provides note counters, including a standard note counter 85, a keyboard note counter 86, and a voice note counter 87. The note window 76 displays a limited number of notes; however, a much larger number of notes may be contained in a client record 8. A view-up selector 88 and a view-down selector 89 are provided for scrolling or paging a group of notes through the note window 76.

The program 7 provides the capability of using a variety of types of notes for entry into the note window 76 of client records 8 and which are broadly defined as standard notes and keyboard notes. Standard notes, as defined in the present invention, may consist entirely of a word or group of words and may also include such a word or words combined with a data field. Keyboard notes, on the other hand, are freeform in nature. The program 7 is provided with a set of predefined standard notes which relate generally to dealing with persons involved in commercial environments and situations. For example, standard notes may include areas of general interest to customers about which a salesman may converse with clients, such as "fisherman", "golfer", "health conscious", etc. or personal idiosyncrasies of the client, such as "non-smoker", non-drinker", or the like which the salesman wishes be aware of to avoid possibly losing a sale by unintentionally encroaching upon. The predefined standard notes may also include ones with data fields which receive further information, such as "appointment:", "deadline:", or the like which can receive date related information.

Figure 6:
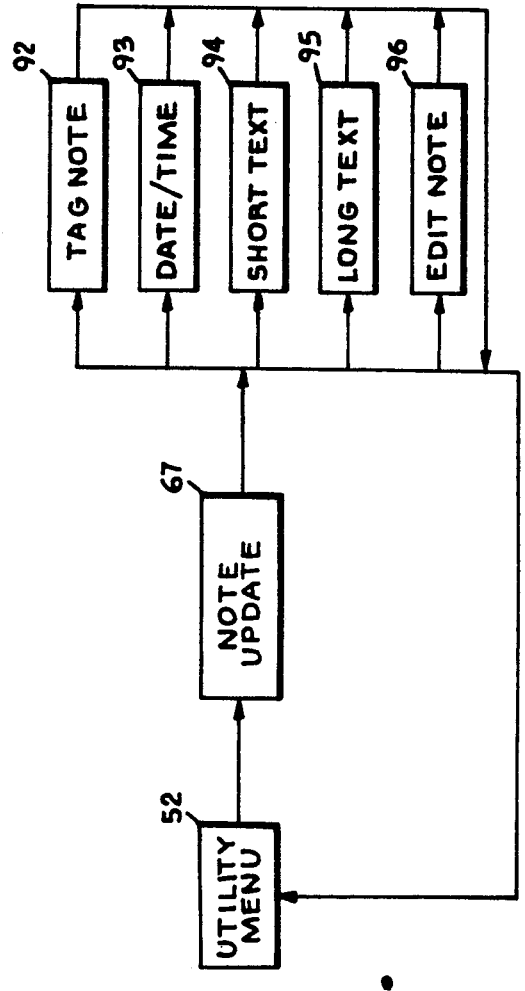
FIG. 6 is a fragmentary menu flow diagram illustrating a submenu for updating information in a client record.

The program 7 also provides users with the capability of defining their own standard notes. Referring to FIG. 6, selecting note update 67 under the utility menu 52 causes a sub-menu to be displayed to allow the user to select the type of note to be created and includes selections for tag note 92, date/time 93, short text 94, and long text 95. An additional selection, designated edit note 96, is provided which allows the user to edit a previously created note. As defined in the present invention, a tag note is a descriptive note without a data field which is more specific than those provided in the predefined notes provided with the program, such as "never returns calls", "prompt payer", and the like. A date/time note is a date or time related note with a data field to be filled in with appropriate information, such as "delivery date:", "leaves office at:", and the like. Short text and long text notes are similar except for the space provided in their data fields. Selecting either short text 94 or long text 95 allows the user to name the note which when selected allows the user to fill in appropriate information. For example, a short text note might be "college:" whereas a long text note might be "order numbers:".

A client record 8 is initially created by selecting the add client menu 62 under the client menu 51 which causes the program 7 to query the user for data to enter into the preset fields 77 with a series of prompts containing the preset field identifiers 78. The program 7 initially fills both of the call fields 80 and 81 with the current date and time. When a particular record 8 is later recalled, the call update 82 may be selected to cause the newly current date and time to be entered into the current call field 81. Thereafter, the date and time in the current call field 81 is cycled up to the previous call field 80 each time the call update box 82 is selected, and the newly current date and time are entered in the current call field 81.

Figure 5:
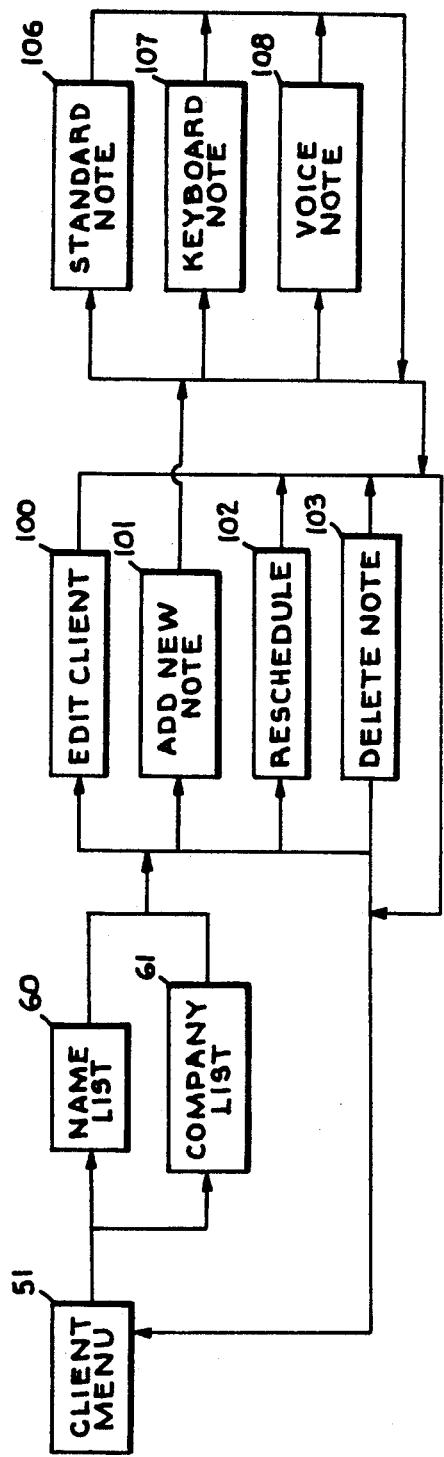
FIG. 5 is a fragmentary menu flow diagram illustrating several layers of nested menus forming one means of recalling client records.

In menus and sub-menus of the program 7 which require the entry of information, "accept" and "cancel" selections are provided to allow the user to accept the data entered, or to cancel the modification. When a client record 8 is being displayed, selection of "accept" causes the record 8 to be stored on the disk 4 or 40 in its modified condition to replace the record as it existed before the modification. Referring to FIG. 5, a client record 8 may be displayed by selecting either name list 60 or company list 61. When such a selection is made, a list of the alphabet is displayed. The first letter of the contact name is selected if name list 60 was previously selected or the first letter of the company if company list 61 was previously selected. This causes a scrollable partial listing of all names or companies having the selected first letter. From this list, the desired client record 8 may be selected.

When the selected client record 8 is displayed, an "edit client" selection 100, an "add new note" selection 101, a reschedule selection 102, and a "delete note" selection 103 are also displayed. The edit client selection 100 displays the preset data fields 78 for selection to change information therein. The reschedule selection 102 displays all date/time related notes in a record 8 for possible modification. The delete note selection 103 causes a scrollable display of all standard notes in a record 8 for selection to be deleted. As illustrated in FIG. 5, the add new note selection 101 causes a menu to be displayed which includes a standard note selection 106, a keyboard note selection 107, and a voice note selection 108. Selecting standard note 106 displays all the current standard notes and allows the user select one or more for insertion in the note window 76 of the currently displayed record 8. Selecting keyboard note 107 causes a keyboard note window to displayed for the entry of freeform text which, when accepted, is inserted in the displayed record 8. Keyboard notes in the note window 76 of a record are designated as such and numbered, as illustrated in FIG. 7.

The database of active client records 8 is stored on the disk 4 or 40 in an active data file. A client record 8 may be deactivated, for any of a number of reasons, by choosing the deactivate client selection 63 under the client menu 51. Such a deactivated client record 8 is removed from the active data file and placed in an inactive data file on the disk 4 or 40. A deactivated record 8 may be subsequently reactivated by selecting "reactivate client" 64 which causes a list of inactive client records to be displayed for selection of the record desired to be reactivated.

The active client records 8 may be searched according to a variety of search criteria by use of the selections 55-58 under the followup menu 50. In general, the search criteria are based on standard notes and date related notes within the note windows 76 of client records 8. For example, a salesman may have previously scheduled several appointments for today, by inserting a date related standard note, including today's date, in the appropriate records 8. He may recall all of today's appointments by choosing the current date selection 55. He may then select the listed records for scheduled appointment times. The optional date selection 56 allows the user to search for records having date related notes therein regarding other dates. Additionally, a range of dates may be entered, and all records with date notes falling within the selected range will be listed.

Client records 8 may be searched on the basis of any existing standard note by selection the standard note criteria 57. The multiple search criteria 58 allows a search of records using a multiplicity of search criteria. This includes groupings of standard notes as well as date notes. The multiple criteria may be related by Boolean type conditions, such as AND, OR, NOT and the like. The single standard note selection 57 displays a scrollable list of standard notes which, when one is selected, causes the display of a scrollable list of records 8 having the selected standard note therein. Choosing the multiple criteria selection 58 causes the display of a fill-in window with boxes to add or delete standard notes and date range fields. Acceptance of the multiple criteria which have been set up by a user causes a display of a list of records 8 having the appropriate combination of notes which have been defined.

In the utility menu 52, the print options selection 66 displays a window for setting up the type of printout desired and selecting the client records 8 to be printed. The set date/clock selection 68 allows the clock/calender 38 to be reset. The clock/calender 38 of the unit 1 is battery backed such that the time and date are normally passed to the program 7 on startup. The backup data selection 69 allows the user to duplicate the program 7 and data files therewith on another floppy disk 4 for safekeeping of the records 8. The computer unit 1 is essentially a general purpose personal computer with optimizations for use in the present invention. However, it is capable of running software other than the client tracking program 7. The exit program selection 70 allows the user to exit the program 7 for such use.

The client tracking program 7 has been described with reference to its use in connection with the computer unit 1. However, with appropriate modifications, the program 7 can be used advantageously on conventional types of desktop, portable, and laptop computers which are hardware and software compatible with the computer unit 1. Additionally, the computer unit 1 has been described as providing for the entry of alphanumerical data using the soft keyboard 10 displayed on the LCD 5 or an external keyboard 25. Alternatively, the computer unit 1 may be provided with an integral keyboard with mechanically actuated keyswitches of a conventional type. Preferably, such an integral keyboard would include only the typewriter section of a keyboard with special function keys provided as soft keys employing the display 5 and membrane switch array 6.

FIGS. 8-15 illustrate embodiments of a client tracking computer unit embodied as a notebook type computer. The computer unit 120 generally includes a base housing or base 121 and a cover panel or "clamshell" 122 hingedly connected to the base 121. The base 121 includes circuitry similar to that shown in FIG. 3 for the computer unit 1, except that the unit 120 preferably is based on a more advanced microprocessor, such as the 80286 or 80386SX (Intel Corp.). The base 121 has a conventional keyboard 123 including a "qwerty" arrangement of keys 124 mechanically connected to individual keyswitches (not shown). The keyboard 123 is illustrated as being recessed within an upper side 125 of the base 121. The cover panel 122 has a flat panel display device 126, such as a high resolution bit-mapped LCD, mounted thereon with a transparent membrane switch array 127 overlayed thereover. The display 126 and membrane array 127 cooperate in the same manner as the display 5 and membrane 6 of the computer 1.

Figure 12:
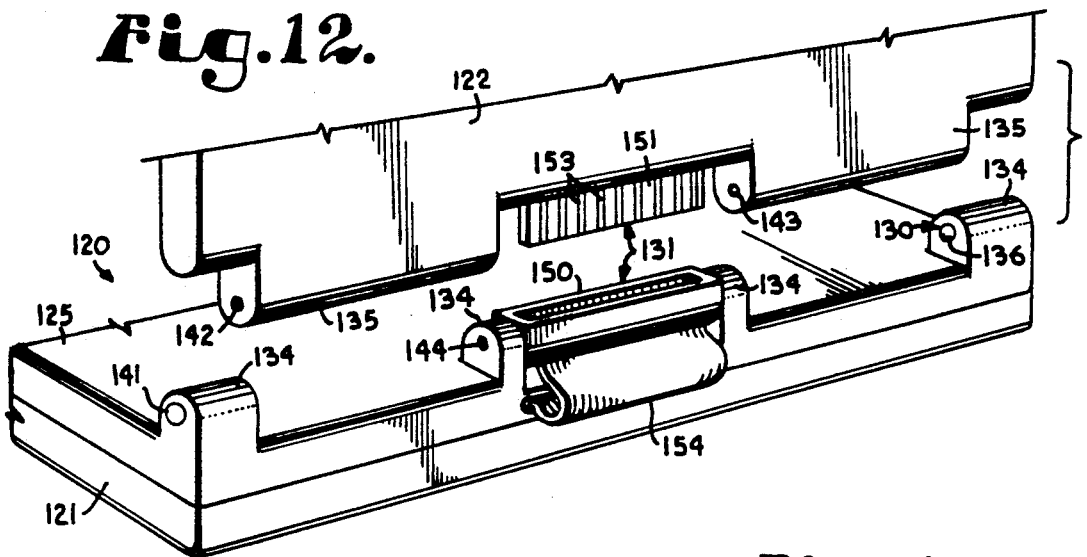
FIG. 12 is an enlarged fragmentary perspective view of the computer unit and illustrates details of a separable hinge arrangement and a separable electrical connector assembly of a preferred embodiment of the invention.
Figure 13:
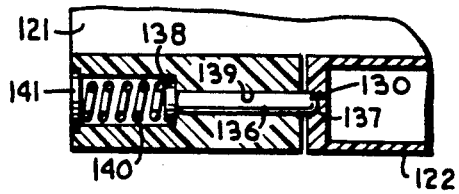
FIG. 13 is an enlarged fragmentary sectional view taken on line 13—13 of FIG. 8 and illustrates details of spring detent hinge components of the computer unit.
Figure 14:
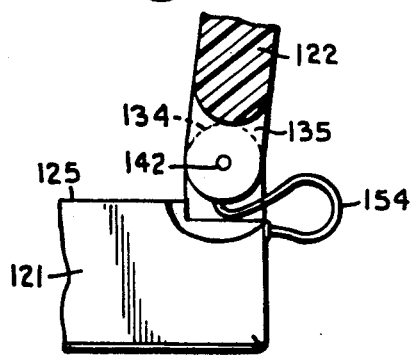
FIG. 14 is an enlarged fragmentary side elevational view of the computer unit with the cover panel in an open position and illustrates details of the relationship between the ribbon cable and the computer unit base.

The present invention is particularly directed to a notebook computer unit 120 which has provisions for positioning the cover panel 122 relative to the base housing 121 so that the unit 120 can be used in a configuration as shown in FIG. 8 by viewing the display 126 and making selections, as in the client tracking program 7, by touching the membrane array 127 at displayed areas on the display 126. Alternatively, it is desirable to preserve the capability of operating the unit 120 in the manner of a conventional notebook or laptop type computer by configuring the unit 120 in the manner illustrated in FIG. 11 by using the standard keyboard 123 in conjunction with viewing the display 126. FIGS. 8-14 illustrate a preferred embodiment of the notebook computer unit with an external membrane switch/display screen which accomplishes such objectives. Referring generally to FIG. 12, the computer unit 120 includes a separable hinge mechanism 130 and a separable electrical connector assembly 131 which cooperate to allow the cover panel 122 to be completely separated from the base housing 121, reversed, and re-attached to the base housing 121 to place the unit 120 in the desired configuration.

The base 121 has a plurality of upstanding ears 134, and the cover panel 122 has a plurality of half cylindrical lugs 135 at an inner end of the panel 122. The outer ears 134 have spring operated detent pins 136 positioned therein which are aligned to define a hinge axis of the hinge mechansim 130. The detent pins 136 are rounded at their outer ends 137 and have widened heads 138 at the opposite ends. The pins 136 are mounted in counterbored bores 139 within the outer ears 134 and are urged inwardly by springs 140 acting against outer cover plugs 141. The outer ends 137 are sized to be received in detent recesses 142 formed in the outer ends of the lugs 135 of the cover panel 122. The inner ends of the lugs 135 are provided with spring detent pins 143, similar to the pins 136, which are received in detent recesses 144 formed in the outer sides of the inner ears 134. The detent pins and recesses on the ears 134 and on the lugs 135 are mutually aligned respectively whereby, when the cover panel 122 is attached to the base 121, the cover panel 121 is pivotal relative to the base 121.

The spring constant of the springs 140 and similar springs (not shown) within the lugs 135 is preferably of such a value that the detent pins 137 and 143 exert some frictional force on their respective recesses 136 and 142 to control the position of the cover panel 122 when in an upright position, as in FIG. 11.

The separable electrical connector assembly 131 includes a card edge socket 150 which is pivotally connected to the inner ears 134 and a card edge connector plate 151 which extends from the inner end of the cover panel 122. The socket 150 has a plurality of opposed sets of socket contacts 152 (FIG. 9) extending therealong which are adapted to mate with a plurality of opposed conductive traces 153 formed on opposite sides of the card edge plate 151. The opposed sets of socket contacts 152 are connected by a flexible multiconductor ribbon cable 154 to input/output port circuitry (not shown) within the base housing 121 while the traces 153 are connected to the display 126 and the membrane array 127 on the cover panel 122. The sets of socket contacts 152 are resiliently urged inward to engage the sets of traces 153 when the card edge plate 151 is inserted into the card edge socket 150.

The socket contacts 152 on opposite sides of the socket 150 are arranged in mutually reversed sequence. Similarly, the traces 153 on the opposite sides of the card edge connector plate 151 are arranged in mutually reversed sequence. This provides for correct routing of the signals between the computer components within the base 121 and the display 126 and membrane 127 no matter which way the connector plate 151 is inserted within the socket 150. Thus, the connector assembly 131 is reversible. Similarly, the ears 134 and lugs 135, and the detent members 136 and 142-144 arranged symmetrically about a front-to-back centerline of the base housing 121, such that the cover panel 122 is reversible with respect to the base housing 121.

The cover panel 122 illustrated in FIGS. 8, 10, and 11 is configured to favor use of the unit 120 in the configuration shown in FIG. 8 in which data and selections are input using the membrane array 127. The illustrated cover panel 122 is provided with latch mechanisms 156 which are usable in a configuration with the display 126 and the membrane array 127 facing away from the base housing 121. However, the unit 120 may alternatively be configured to favor conventional use of the unit 120 (FIG. 11) or to provide equal facility in either configuration. Further, the cover panel 122 may be provided with a second flat panel display 157 on an inner surface with the display 126 and membrane array 127 on the outer surface, and the separable hinge mechanism 130 and separable connector assembly 131 dispensed with entirely. This would provide the desired capabilities of the present invention but would result in a more expensive and probably heavier computer unit 120.

Figure 15:
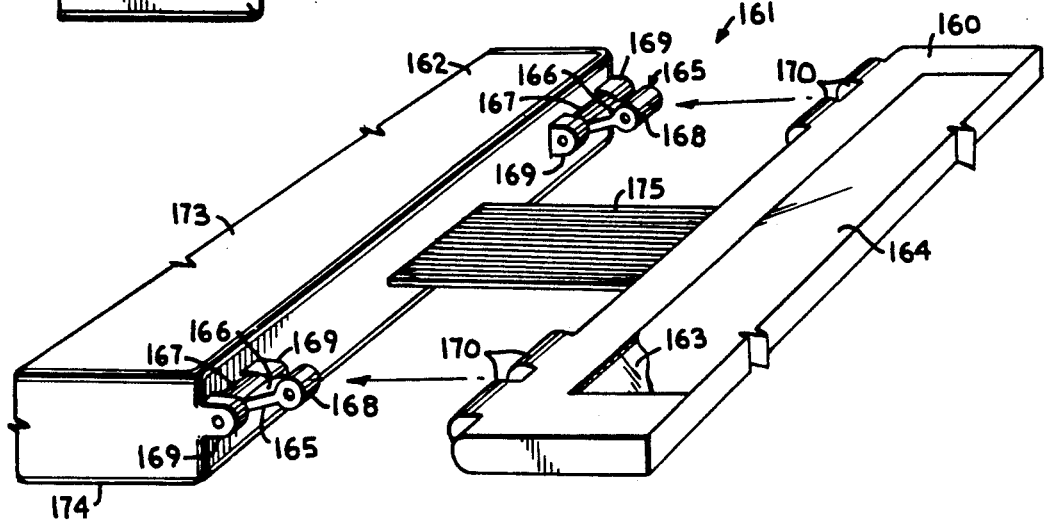
FIG. 15 is an enlarged fragmentary perspective view of an alternative embodiment of the computer unit employing a compound hinge mechanism with a cover member thereof shown separated from a computer base of the unit and a ribbon cable connecting between components within the computer base and the cover.

FIG. 15 illustrates an alternative embodiment of the present invention in which a cover panel 160 of a notebook computer unit 161 is permanently hinged to a base housing 162 thereof, but has the capability of providing similar configurations as the computer unit 120. The cover panel 160 has a flat panel display device 163 thereon with a transparent membrane switch array 164 overlayed thereon. The cover panel 160 is connected to the base housing 162 by compound hinge assemblies 165. Each compound hinge assembly 165 includes a hinge link 166 with a base hinge barrel 167 at one end and a cover hinge barrel 168 at the opposite end. Each base barrel 167 is pivotally connected to a pair of spaced apart base knuckles 169 while each cover barrel 168 is pivotally connnected to a pair of spaced apart cover knuckles 170.

The compound hinge links 166 define separate parallel hinge axes, one for the base knuckles 169 and one for the cover knuckles 170. This extends the cover panel 160 away from the base housing 162 so that the cover panel 160 can be pivoted between extreme positions in which the cover panel 160 overlies an upper side 173 of the base housing 162 with the display 163 and membrane 164 facing toward the base 162, and an opposite extreme in which the cover panel 160 overlies a lower side of the base 162 and the display 163 and array 164 face away from the base 162. In the latter configuration, the unit 161 is inverted for use in the same manner as shown in FIG. 8. The display 163 and membrane array 164 are connected to computer circuitry (not shown) within the base housing 162 by a permanently attached, flexible, multiconductor ribbon cable 175.

It is to be understood that while certain forms of the present invention have been illustrated and described herein, it is not to be limited to the specific forms or arrangement of parts described and shown.

I claim:

1. A portable computer unit comprising:
   (a) a portable computer housing;
   (b) computer means positioned in said housing;
   (c) flat panel display means interfaced to said computer means;
   (d) a transparent data entry array interfaced to said computer means and overlayed on said display means; and
   (e) closure panel means having said display means and said array mounted thereon on one side and reversibly hingedly connected to said housing in such a manner as to enable said closure panel means to be pivotally positioned in a first position in overlying relation to said housing with said display means facing away from said housing for use of said data entry array and alternatively to be pivotally positioned in a second position in overlying relation to said housing with said display means facing toward said housing, said computer housing means and said closure panel means incorporating electrical connecting means adapted to electrically connect said display means and said data entry array to said computer means in both said first and said second positions.

2. A unit as set forth in claim 1 wherein:
   (a) said electrical connecting means comprises separable electrical connector means electrically coupling said display means and said array to said computer means, said separable electrical connector means being reversible to enable reversing said closure panel relative to said housing.

3. A unit as set forth in claim 2 wherein:
   (a) said electrical connecting means includes a component which is hingedly connected to one of said housing and said closure panels.

4. A unit as set forth in claim 2 wherein said separable electrical connector means includes:
   (a) a card edge connector extending from one of said closure panel means and said housing; and
   (b) a card edge connector socket pivotally mounted on the other of said closure panel means and said housing to enable pivoting about a hinge axis of said other closure panel means and said housing.

5. A unit as set forth in claim 1 and including:
   (a) separable hinge means removably and hingedly connecting said closure panel means to said computer housing, said hinge means enabling removal and reversing of said closure panel means relative to said housing.

6. A unit as set forth in claim 5 wherein said hinge means includes:
   (a) a plurality of cooperating detent means positioned on said housing and said closure panel means, said detent means being aligned along hinge axes of said housing and said closure panel means, and said detent means enabling said closure panel means to pivot relative to said housing and to be separated therefrom.

7. A unit as set forth in claim 5 wherein said hinge means includes:
   (a) a plurality of cooperating spring detent means positioned on said housing and said closure panel means, said detent means being aligned along hinge axes of said housing and said closure panel means, and said detent means enabling said closure panel means to pivot relative to said housing and to be separated therefrom.

8. A unit as set forth in claim 1 wherein said housing has an upper side and a lower side, and including:
   (a) compound hinge means connecting said closure panel means to said housing, said hinge means enabling relative pivoting of said closure panel means and said housing from a first position wherein said closure panel means overlies said upper side with said display means facing said upper side to a second position wherein said closure panel means overlies said lower side with said display means facing away from said lower side.

9. A unit as set forth in claim 1 wherein:
   (a) said electrical connecting means comprises flexible cable means electrically connecting said display means and said array to said computer means.

10. A unit as set forth in claim 1 and including:
    (a) a conventional keyboard mounted on said housing.

11. A unit as set forth in claim 1 wherein:
    (a) said housing is a notebook computer type housing.

12. A portable computer unit comprising:
    (a) a portable computer housing:
    (b) computer means positioned in said housing;
    (c) a keyboard mounted on said housing and interfaced to said computer means;
    (d) a computer unit closure panel hingedly connected to said housing and pivotal relative thereto;
    (e) flat panel display means interfaced to said computer means and mounted on a first side of said closure panel;
    (f) a transparent data entry array interfaced to said computer means and overlayed on said display means on said first side of said closure panel; and
    (g) reversible hinge means hingedly connecting said closure panel to said housing and electrical connecting means interfacing said display means and said array to said computer means, said hinge means and connecting means cooperating in such a manner as to enable said closure panel to be pivotally positioned in a first position with said display means generally facing said keyboard to facilitate use of said unit by operation of said keyboard while viewing said display means and, alternatively, to enable pivotally positioning said closure panel in a second position in overlying relation to said housing with said display means and said array facing away from said housing to facilitate use of said unit by operation of said array while viewing said display means, and such that said display means and said data entry array are electrically connected to said computer means in both said first and said second positions.

13. A unit as set forth in claim 12 wherein:
    (a) said hinge means is separable and reversible to enable removal of said closure panel from said housing and connection of said closure panel to said housing in a reversed manner.

14. A unit as set forth in claim 13 wherein said hinge means includes:
    (a) a plurality of cooperating spring detent means positioned on said housing and said closure panel, said detent means being aligned along hinge axes of said housing and said closure panel, and said detent means enabling said closure panel to pivot relative to said housing and to be separated therefrom.

15. A unit as set forth in claim 12 wherein said housing has an upper side and a lower side, and said reversible hinge means including:

(a) compound hinge means connecting said closure panel to said housing, said hinge means enabling relative pivoting of said closure panel and said housing from a first position wherein said closure panel overlies said upper side to a second position wherein said closure panel overlies said lower side.

16. A unit as set forth in claim 15 and said electrical connecting means including:
   (a) flexible cable means electrically connecting said display means and said array to said computer means.

17. A unit as set forth in claim 12 and wherein:
   (a) said electrical connecting means includes separable electrical connector means electrically coupling said display means and said array to said computer means, said connector means being reversible to enable reversed connection of said closure panel to said housing; and
   (b) said separable electrical connector means including a component which is hingedly connected to one of said housing and said closure panel.

18. A unit as set forth in claim 12 and wherein said electrical connecting means includes:
   (a) a card edge connector extending from one of said closure panel and said housing, said connector including a plurality of pairs of conductive traces on respective opposite sides of said connector which are connected to said display means and said array, the sequence of traces on one side of said connector being reversed on the opposite side thereof whereby said connector is reversible;
   (b) a card edge connector socket pivotally mounted on said housing to enable pivoting about a hinge axis of said housing, said socket including a plurality of pairs of socket contacts on respective opposite sides of said socket, the sequence of contacts on one side of said socket being reversed on the opposite side thereof to enable said socket to reversibly receive said connector; and
   (c) flexible cable means electrically connecting said socket contacts to said computer means.

19. A unit as set forth in claim 12 wherein said hinge means includes:
   (a) a plurality of cooperating spring detent means positioned on said housing and said closure panel, said detent means being aligned along hinge axes of said housing and said closure panel, and said detent means enabling said closure panel to pivot relative to said housing and to be separated therefrom; and said electrical connecting means includes:
   (b) a card edge connector extending from one of said closure panel and said housing, said connector including a plurality of pairs of conductive traces on respective opposite sides of said connector which are connected to said display means and said array, the sequence of traces on one side of said connector being reversed on the opposite side thereof whereby said connector is reversible;
   (c) a card edge connector socket pivotally mounted on said housing to enable pivoting about a hinge axis of said housing, said socket including a plurality of pairs of socket contacts on respective opposite sides of said socket, the sequence of contacts on one side of said socket being reversed on the opposite side thereof to enable said socket to reversibly receive said connector; and
   (d) flexible cable means electrically connecting said socket contacts to said computer means.

20. A portable computer unit comprising:
   (a) a portable computer housing;
   (b) computer means positioned in said housing;
   (c) a plurality of key switches interfaced to said computer means and mounted on said housing;
   (d) flat panel display means interfaced to said computer means;
   (e) a transparent data entry array interfaced to said computer means and overlayed on said display means; and
   (f) closure panel means having said display means and said array mounted thereon on an outer side and connected to said housing in such a manner as to enable said closure panel means to be positioned in covering relation to said key switches with said display means and said array facing away from said key switches and to enable pivoting said closure panel means away from said housing to provide access to said key switches, while still leaving said display means and said array interfaced to said computer means.

* * * * *

(12) EX PARTE REEXAMINATION CERTIFICATE (9045th)
United States Patent
Lund

(10) Number: US 5,283,862 C1
(45) Certificate Issued: Jun. 5, 2012

(54) NOTEBOOK COMPUTER WITH REVERSIBLE COVER FOR EXTERNAL USE OF MEMBRANE SWITCH SCREEN

(75) Inventor: Alan K. Lund, Lee's Summit, MO (US)

(73) Assignee: Lund, L.L.C., Milford, MI (US)

Reexamination Request:
No. 90/008,240, Sep. 19, 2006

Reexamination Certificate for:
Patent No.: 5,283,862
Issued: Feb. 1, 1994
Appl. No.: 08/048,900
Filed: Apr. 16, 1993

Related U.S. Application Data

(63) Continuation of application No. 07/612,956, filed on Nov. 12, 1990, now abandoned, which is a continuation-in-part of application No. 07/420,047, filed on Oct. 11, 1989, now abandoned.

(51) Int. Cl.
G06F 13/00 (2006.01)
G06F 3/033 (2006.01)
G06F 15/02 (2006.01)
G06F 1/16 (2006.01)

(52) U.S. Cl. ............... 345/173; 361/679.09; 361/679.28; 361/679.29

(58) Field of Classification Search ........................ None
See application file for complete search history.

(56) References Cited

To view the complete listing of prior art documents cited during the proceeding for Reexamination Control Number 90/008,240, please refer to the USPTO's public Patent Application Information Retrieval (PAIR) system under the Display References tab.

*Primary Examiner* — Albert J Gagliardi

(57) ABSTRACT

A notebook computer unit formed by a base housing and a hinged cover panel has a conventional keyboard mounted on the base housing, a flat panel display device mounted on the cover panel, and a transparent membrane switch array overlayed on the display. The unit includes a separable and reversible hinge mechanism and a separable and reversible electrical connector assembly which allow the cover panel to be detached, reversed, and re-attached to place the unit in one of two configurations. In one configuration, the display and tactile membrane switch array face outwardly with the cover panel overlying the base for operation of the unit by viewing the display and touching the membrane switch array to enter data and select options displayed. Alternatively, the cover panel may be oriented with the display generally facing the standard keyboard for use of the unit as a conventional notebook type computer.

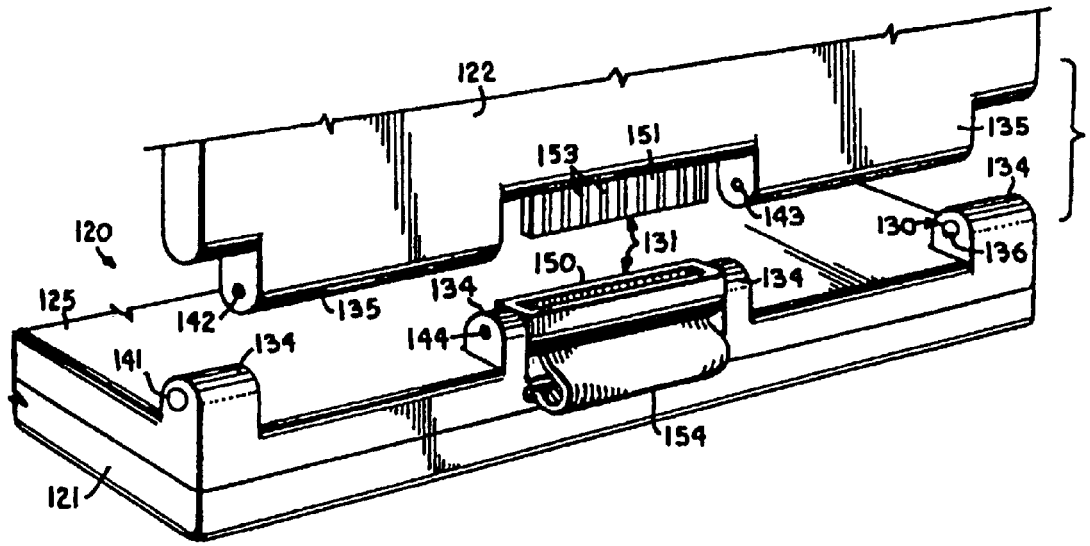

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1, 9-12 and 20-25 are cancelled.
Claims 2-8 and 13-19 were not reexamined.

\* \* \* \* \*